(12) United States Patent
Kuenzner

(10) Patent No.: US 7,730,421 B2
(45) Date of Patent: Jun. 1, 2010

(54) METHOD FOR CONTROLLING A SCREEN DISPLAY SYSTEM IN MOTOR VEHICLES

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1253 days.

(21) Appl. No.: 11/032,189

(22) Filed: Jan. 11, 2005

(65) Prior Publication Data

US 2005/0183037 A1    Aug. 18, 2005

Related U.S. Application Data

(63) Continuation of application No. PCT/EP03/06655, filed on Jun. 24, 2003.

(30) Foreign Application Priority Data

Jul. 12, 2002   (DE) ............................... 102 31 619

(51) Int. Cl.
*G06F 3/048* (2006.01)

(52) U.S. Cl. .................. 715/811; 715/814; 715/817; 715/825

(58) Field of Classification Search ........... 715/811, 715/814, 817, 821–825
See application file for complete search history.

(56) References Cited

U.S. PATENT DOCUMENTS

| | | | |
|---|---|---|---|
| 5,270,689 A | | 12/1993 | Hermann |
| 5,420,975 A | * | 5/1995 | Blades et al. ............... 715/811 |
| 5,732,368 A | * | 3/1998 | Knoll et al. ..................... 701/1 |
| 5,784,059 A | * | 7/1998 | Morimoto et al. ........... 715/854 |
| 5,963,207 A | * | 10/1999 | Brewer et al. ............... 715/810 |
| 5,999,228 A | * | 12/1999 | Matsuura et al. ............ 348/569 |
| 6,005,577 A | * | 12/1999 | Breitlow ..................... 715/825 |
| 6,266,060 B1 | * | 7/2001 | Roth ........................... 715/853 |
| 7,000,195 B2 | * | 2/2006 | Komuro ..................... 715/805 |
| 2001/0019338 A1 | | 9/2001 | Roth |

FOREIGN PATENT DOCUMENTS

| | | |
|---|---|---|
| DE | 38 36 555 A1 | 5/1990 |
| DE | 44 33 953 A1 | 3/1996 |
| DE | 195 29 571 A1 | 2/1997 |
| DE | 197 43 249 A1 | 4/1998 |
| DE | 198 32 096 A1 | 1/1999 |
| DE | 198 29 568 A1 | 1/2000 |
| DE | 199 10 240 A1 | 9/2000 |
| DE | 199 32 776 A1 | 1/2001 |
| DE | 199 55 890 A1 | 6/2001 |

(Continued)

*Primary Examiner*—Tadeese Hailu
(74) *Attorney, Agent, or Firm*—Crowell & Moring LLP

(57) ABSTRACT

A method for controlling a screen display system in vehicles is provided, including a setting element or actuator that can be arbitrarily operated, and information that can be displayed on a screen according to the setting of the setting element. According to the invention, the amount of image information contained in the image information is set by using the setting element. The method graphical displays a hierarchical menu structure consisting of menus, submenus, functions and/or a functional value. The assignment of different menu items to the amounts of image information assigned to the settings of the setting element ensues according to the frequency with which the respective menu item has been selected during preceding operations.

7 Claims, 2 Drawing Sheets

Illustration 2: AM, stations, manual, GONG and CLASSICAL were seldom selected and represented more weakly.

FOREIGN PATENT DOCUMENTS

| | | |
|---|---|---|
| DE | 200 03 800 U1 | 8/2001 |
| DE | 100 57 077 A1 | 10/2001 |
| DE | 100 50 223 A1 | 4/2002 |
| DE | 696 13 653 T2 | 5/2002 |
| EP | 607 731 A2 | 7/1994 |
| EP | 1 024 056 A2 | 8/2000 |
| EP | 1 069 496 A2 | 1/2001 |

* cited by examiner

```
FM AM CD SAT

All transmitter stations manual
BAVARIA 3
GONG
|ARABELLA|
B5AKT
CLASSICAL
```

Fig. 1a

Illustration 1: All functions are represented.

```
FM AM CD SAT

All transmitter stations manual
BAVARIA 3

|ARABELLA|
GONG
B5AKT
CLASSICAL
```

Fig. 1b

Illustration 2: AM, stations, manual, GONG and CLASSICAL were seldom selected and represented more weakly.

```
FM CD SAT

All transmitters

BAVARIA 3

|ARABELLA|
B5AKT
```

Fig. 1c

Illustration 3: The "dimmer" was activated, the statistically weaker functions disappear. They can, however, be called up again at any time by activation in the other direction.

Illustration 4: Since only one entry is still present in the menu level, "all stations...", this level can be completely dispensed with.

METHOD FOR CONTROLLING A SCREEN DISPLAY SYSTEM IN MOTOR VEHICLES

CROSS-REFERENCE TO RELATED APPLICATIONS

This application is a continuation of PCT Application No. PCT/EP2003/006655 filed on Jun. 24, 2003, which claims priority to German Application No. 102 31 619.8 filed Jul. 12, 2002.

BACKGROUND AND SUMMARY OF THE INVENTION

The invention relates to a method for controlling a screen display system in motor vehicles with an actuator that can be arbitrarily operated, and with information that can be displayed on a screen depending upon the setting of the actuator. The amount of image information contained in the image information is adjusted using the actuator. Such a method is disclosed in an earlier, non-published patent application DE 101 51 282.1.

Controlling image information menu-like with an actuator is known from DE 38 36 555 A1.

With the menu structure consisting hierarchically of menu, submenu and functions and/or function value, the individual menu item is selected using the actuator and allocated image information is reproduced on a screen. The actuator is, moreover, primarily used for navigation through the menu structure. The reproduced image information arises as a result of the respectively selected nodal (menu) points of the functional (menu) hierarchy.

It is achieved with the patent application DE 101 51 282.1 mentioned above that the reproducible information is more strongly adapted to the information needs of the motor vehicle user. For this, the amount of image information contained in the image information is adjustably configured using the actuator. This, moreover, results in various levels of the amount of information with, in particular, that each amount of image information is a sub-quantity of each larger amount of image information.

Here, moreover, exists the difficulty of appropriately selecting the menu items to be displayed or not to be displayed and allocated to the respective positions of the actuator. A more theoretical possibility of controlling the amount of information consists of shielding the unused branches of the menu structure so that the menu structure is simplified and the user only finds the actually desired functions. Removing parts of the menu structure, however, can confuse and impair orientation within the menu.

The allocation of the individual menu items to the various amount levels of information is also especially difficult because different users have different user habits and each user goes through a learning curve in terms of knowledge of the system.

The invention is based upon the objective of creating a method of the type mentioned above that undertakes a correspondingly appropriate selection of the amount of information to be represented in connection with a hierarchically built menu structure as it is known, for example, from DE 38 36 555 A1.

The invention accomplishes this by providing a method for controlling a screen information system in motor vehicles with an actuator that can be operated as desired, and with image information displayable on a screen as a function of the setting of the actuator. The amount of image information contained in the image information is set using the actuator. A hierarchical menu structure is applied to the graphic representation, consisting of menus, submenus, functions and/or function value. Different menu items are allocated in relation to the amount of image information allocated to the settings of the actuator as a function of the frequency with which the respective menu item was selected during previous operating cases.

The method depicts the use habits of the user. Information on the menu items or menu branches are successively hidden in accordance with the use needs of the user. The necessity of requiring the respective menu item is derived from the frequency with which the user has selected it in preceding operating cases.

The computer unit that is, in any case, present for representing the menu structure records the user inputs and evaluates them statistically. In this way, the "information paths" entered upon by the user (that is, the paths pursued within the menu structure) are recorded and weighted according to use frequency. The paths less used, or not used at all, can in addition be characterized graphically, for example, in that they are represented with a lower contrast. The user can now "dim" his/her menu structure, thus reducing the amount of information represented, with the actuator. For example, if the actuator is a rotary switch with latched positions known from DE 38 36 555 A1, the menu items assessed as the weakest (that is, the menu items selected most seldom or not at all) are hidden by rotating the actuator. By further rotation, the next category, etc. up to only even very frequently used menu items/functions are displayed.

This process can be reversed at any time in that the actuator is rotated in the other direction and in this way brings the hidden menu points back into prominence. In the event that the system was never used or only used for a very short time, there exists the possibility of using a standard profile for the sequence for "dimming" the amount of information. This profile can, for example, be ascertained as a function of a particular country so that regional habits can be taken into consideration. Thus, there is a good initial basis that can be adapted to the user in the further course of use.

For implementing the described menu system, the statistical recording of selection frequencies in necessary. Statistics are compiled for each menu item, documenting how frequently or how regularly it is selected by the user.

Various resolution possibilities are offered for compiling these statistics. It can be advantageous to distinguish between the actual functions (thus, for example, playing a radio station) and navigation, thus finding the menu path to these functions (for example the menu item, "all stations"). Functions must be upgraded in the statistical evaluation when they are used over a long period of time (for example, when the radio station is listened to for more than 5 minutes). For functions that are used only temporarily during navigation (that is when running through the menu pathways) this does not mean much. Here, an upgrade can take place, for example, when the function was in fact selected.

Menu items can correspondingly also be downgraded. If, for example a radio station is not selected or is only selected for a very short time when changing stations, downgrading takes place.

The menu (items) statistics determinative for allocating individual menu items to the positions of the actuator are stored as a function of the motor vehicle key. This way, it is possible to use the statistics not only as a function of the user for the selection of the menu item to be selected, but to maintain them also individually by user in that each new case of use is entered into the individual statistics of each use. The precondition for this is that each user only uses "his/her" key.

These statistics can also be used outside the motor vehicle. It would be possible to ascertain the actual frequency of use of functions and thereby the acceptance with the customer: How frequently, for example, does the user return to the average use 2, or how frequently does a change to the AM station take place? Are specified radio stations used, or rather perhaps is the list of available radio stations reproduced by the radio itself?

It is possible with the method described to represent the really important functions for the individual person out of a large variety of functions in a drastically simplified menu structure. This structure is, on the one hand, more easily comprehensible and can, on the other hand, be operated more rapidly. Regional characteristics in use habits can be compensated for without difficulty. This results overall in a gain in driving safety and operating comfort.

Other objects, advantages and novel features of the present invention will become apparent from the following detailed description of the invention when considered in conjunction with the accompanying drawings.

BRIEF DESCRIPTION OF THE DRAWINGS

FIGS. 1a-1d show the sequence of a manual control of the amount levels of information, which can be adjusted for a menu structure in parts a through d.

DETAILED DESCRIPTION OF THE DRAWINGS

Figure 1D:
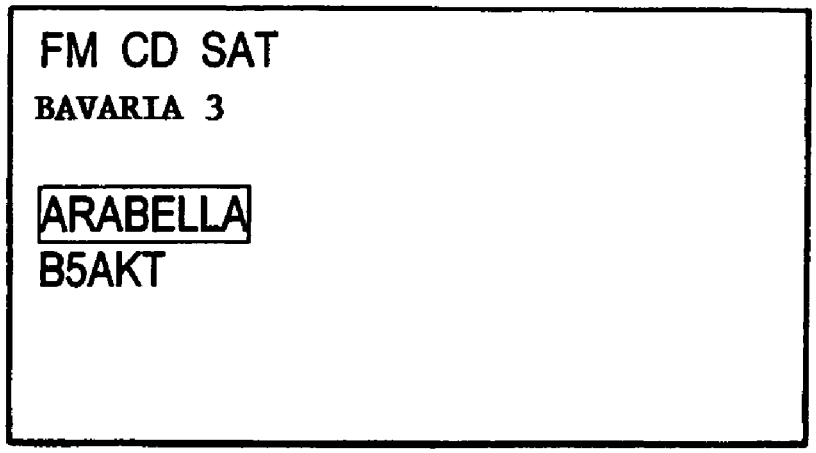

The basic position of image information is shown in FIG. 1a for the end position of an actuator (not represented), illustrating all the image information belonging to this menu in connection with a menu structure (not represented) consisting of various menus such as "travel route navigation", "heating/air conditioning" and "entertainment". It involves the submenus FM, AM (stations), CD (player) as well as SAT (Satellite Television Reception).

Parts of the image information that were not selected at all, or were seldom selected during past instances of use, are represented optically weaker in the next latching position (FIG. 1b). These are AM (stations) as well as the FM stations "GONG" and "CLASSICAL".

FIG. 1c shows the amount of information for the next latching position of the actuator. The more weakly represented ranges are now completely hidden, and CD and SAT are more weakly represented. In this way, it is expressed visually that the functions CD and SAT are used somewhat more frequently than the already entirely hidden areas. They are for this reason not yet hidden during the first dimming stage.

Finally, FIG. 1d shows the reduction of the amount of information to the three most frequently selected FM stations.

Not illustrated is the possibility of further reducing the amount of information with the actuator and only indicating the station that was most frequently selected overall.

A separate switch (not represented) can be provided to distinguish between the actual setting mode with the aid of the actuator and the control of the amount of image information represented. Alternatively, an altered way of operating the actuator (for example, by pulling it out) can be set for this, and in this way, selection of the functions and the control of user-specific image contents can be achieved with one actuator.

In the event of a possible competition of preferred and temporarily selected menu items, i.e., in setting an inherently rarely selected menu item, the following rule applies:

The currently set menu item is constantly displayed. The following sequence applies for the critical case: Only when another menu item is selected is the previously selected menu item no longer displayed. In place of, or also in addition to, the frequency that is used for the statistics, the duration with which the menu item was selected was also considered. Here, an operation duration statistic is used as a basis. For example, a station X is listened to for 5 hours. While a station Y was selected more frequently, it was listened to only for 2 hours. In the display corresponding to FIG. 1d, only station X is then displayed.

Situational parameters can also be taken into consideration: B5A is always listened to in the morning, classical music in the evening, that is, different probabilities for the selection of certain menu points result as a function of the time of day. Other parameters, such as weekend or weekday, length of the planned trip, number of the persons in the motor vehicle, etc., can likewise be taken into consideration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an information display screen in a motor vehicle using an actuator operably coupled with the information display screen, wherein image information is reproduced on the screen as a function of a setting of the actuator and wherein an amount of image information contained in the image information is set using the actuator, the method comprising the acts of:
   applying a hierarchical menu structure to a graphic representation on the screen, the hierarchical menu structure including menus, submenus, functions and/or function values;
   allocating different menu items in relation to an amount of image information allocated to settings of the actuator as a function of a frequency with which a particular respective menu item was selected during previous operating cases; and
   additionally weighting the frequency as a function of a duration during which a respective menu item is selected.

2. The method according to claim 1, further comprising the act of ascertaining the frequency in a statistical manner during the preceding operating cases.

3. The method according to claim 2, further comprising the act of altering an optical intensity with which a respective menu item is represented on the screen using the actuator.

4. The method according to claim 3, wherein amount levels of image information allocated to the settings of the actuator are specified in a fixed manner in an initial phase of operation.

5. The method according to claim 2, wherein amount levels of image information allocated to the settings of the actuator are specified in a fixed manner in an initial phase of operation.

6. The method according to claim 1, wherein amount levels of image information allocated to the settings of the actuator are specified in a fixed manner in an initial phase of operation.

7. The method according to claim 1, further comprising the act removing a first menu item from the screen that has been selected less frequently than other menu items.

* * * * *